US012738692B2

(12) United States Patent
Elsasser et al.

(10) Patent No.: US 12,738,692 B2
(45) Date of Patent: Sep. 15, 2026

(54) CABLE CONNECTOR STRAIN-LIMITING RELEASE MECHANISM(S)

(71) Applicant: INTERNATIONAL BUSINESS MACHINES CORPORATION, Armonk, NY (US)

(72) Inventors: Ryan Elsasser, Salt Point, NY (US); Brianna Malcolm, Hyde Park, NY (US); Celeste Erandi Arellano Mendoza, Morelia (MX); David Hulton, Staatsburg, NY (US); Megan Heller, Houston, TX (US); Jelani Owens, Pleasant Valley, NY (US); Katjah Polycarpe, Poughkeepsie, NY (US); Alexander Ralston, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 343 days.

(21) Appl. No.: 18/589,603

(22) Filed: Feb. 28, 2024

(65) Prior Publication Data

US 2025/0273905 A1 Aug. 28, 2025

(51) Int. Cl.

*H01R 13/633* (2006.01)
*H01R 13/627* (2006.01)
*H01R 13/639* (2006.01)

(52) U.S. Cl.

CPC ....... *H01R 13/6335* (2013.01); *H01R 13/627* (2013.01); *H01R 13/639* (2013.01)

(58) Field of Classification Search

CPC .......................... H01R 13/6335; H01R 13/627

(Continued)

(56) References Cited

U.S. PATENT DOCUMENTS 3,786,410 A * 1/1974 Hazelhurst ............. G01V 1/201 439/301
6,536,084 B2 3/2003 Davis (Continued)

FOREIGN PATENT DOCUMENTS

CA 2831110 A1 1/2015
CN 205178149 U 4/2016

(Continued)

OTHER PUBLICATIONS

International Searching Authority, "Notification of Transmittal of the International Search Report and the Written Opinion of the International Searching Authority, or Declaration," Patent Cooperation Treaty May 23, 2025, 12 pages, International Application No. PCT/ EP2025/055058.

(Continued)

*Primary Examiner* — Phuong K Dinh

(74) *Attorney, Agent, or Firm* — Michael A. Petrocelli, Esq.; Kevin P. Radigan, Esq.; Heslin Rothenberg Farley & Mesiti P.C.

(57) ABSTRACT

A release mechanism is provided to connect to a cable connector, with the cable connector being latchable to a connector receptacle. The release mechanism includes a pull release to operatively couple to a latching mechanism of the cable connector to selectively release a latch of the latching mechanism from latching the cable connector to the connector receptacle when operatively coupled to the connector receptacle. The pull release is adapted to, at least in part, break apart in operation in response to a predetermined excess stress event on the pull release to facilitate protecting the cable connector from excessive stress due to the stress event.

20 Claims, 14 Drawing Sheets

(58) Field of Classification Search
USPC ................................ 439/352, 475, 474, 258
See application file for complete search history.

(56) References Cited

U.S. PATENT DOCUMENTS

| | | | |
|---|---|---|---|
| 6,591,461 B2 | 7/2003 | Salentine et al. | |
| 7,318,740 B1 | 1/2008 | Henry et al. | |
| 7,354,292 B1 | 4/2008 | Lloyd et al. | |
| 7,497,477 B2 | 3/2009 | Pepe | |
| 8,410,369 B2 | 4/2013 | Kim et al. | |
| 9,028,270 B1 | 5/2015 | Vanderwoud | |
| 10,326,230 B2 | 6/2019 | Schaefer et al. | |
| 10,989,343 B2 | 4/2021 | Madocks | |
| 11,061,194 B2 * | 7/2021 | Zhou .................... | G02B 6/4261 |
| 2006/0124676 A1 | 6/2006 | Mastrosimone | |
| 2021/0206612 A1 | 7/2021 | Peternel et al. | |

FOREIGN PATENT DOCUMENTS

| | | |
|---|---|---|
| DE | 202018100224 U1 | 1/2018 |
| WO | 2004/036699 A1 | 4/2004 |
| WO | 2025/181091 A1 | 9/2025 |

OTHER PUBLICATIONS

Lassen et al., "A clean Break: Breakaway Connectors in Medical Devices." Jun. 2019. pp. 1-8.
Lemo, "How to Specify a Break-Away Connector." Oct. 2017. pp. 1-10.

* cited by examiner

CABLE CONNECTOR STRAIN-LIMITING RELEASE MECHANISM(S)

BACKGROUND

One or more aspects relate, in general, to system networking, such as computer networking, and more particularly, to cable connector release mechanisms for use with component cabling of a system network.

Connectors are devices used to connect and create an operative coupling between different system components. For instance, in system networking, such as computer networking, cable connectors can be used to interconnect system components. A server network can contain tens or even hundreds, or more, cables which connect between network components. Thousands of connector configurations are available, including, for instance, for establishing power connections, data connections, signal communication connections, audio visual applications, etc. Often, connectors are differentiated by function, and include inline cable connectors permanently attached to a cable, allowing the cable to be plugged into a connector receptacle, such as a connector receptacle permanently attached to an electronic component, such as a server.

Various types of modern cables and cable connectors include a latching mechanism to allow the connector to be latched in an operative position to the appropriate connector receptacle of the system component.

SUMMARY

Certain shortcomings of the prior art are overcome and additional advantages are provided through the provision, in one or more aspects, of an apparatus, which includes a release mechanism to connect to a cable connector. The cable connector is latchable to a connector receptacle, such as a connector receptacle of an electronic component. The release mechanism includes a pull release to operatively couple to a latching mechanism of the cable connector to selectively release a latch of the latching mechanism from latching the cable connector to the connector receptacle when operatively coupled to the connector receptacle. The pull release is adapted to, at least in part, break apart in operation in response to a predetermined excess stress event on the pull release to facilitate protecting the cable connector from excess stress due to the stress event.

In another aspect, an apparatus is provided which includes a cable connector and a release mechanism. The cable connector is to operatively latch to a connector receptacle coupled to an electronic component, and the release mechanism is connected to the cable connector. The release mechanism includes a pull release operatively coupled to a latching mechanism of the cable connector to selectively release a latch of the latching mechanism from latching the cable connector to the connector receptacle when operatively coupled to the connector receptacle. The pull release is adapted to, at least in part, break apart in operation in response to a predetermined excess stress event on the pull release to facilitate protecting the cable connector from excessive stress due to the stress event.

In a further aspect, a method is provided which includes providing a release mechanism for a cable connector. The cable connector is latchable to a connector receptacle, and providing the release mechanism for the cable connector includes operatively coupling a pull release to a latching mechanism of the cable connector to selectively release a latch of the latching mechanism from latching the cable connector to the connector receptacle when operatively coupled to the connector receptacle. In addition, providing the release mechanism for the cable connector includes integrating a releasable coupling as part of the pull release. The releasable coupling is adapted to, at least in part, break apart in operation in response to a predetermined excess stress event on the pull release to facilitate protecting the cable connector from excessive stress due to the stress event.

Additional features and advantages are realized through the techniques described herein. Other embodiments and aspects are described in detail herein and are considered part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1A:
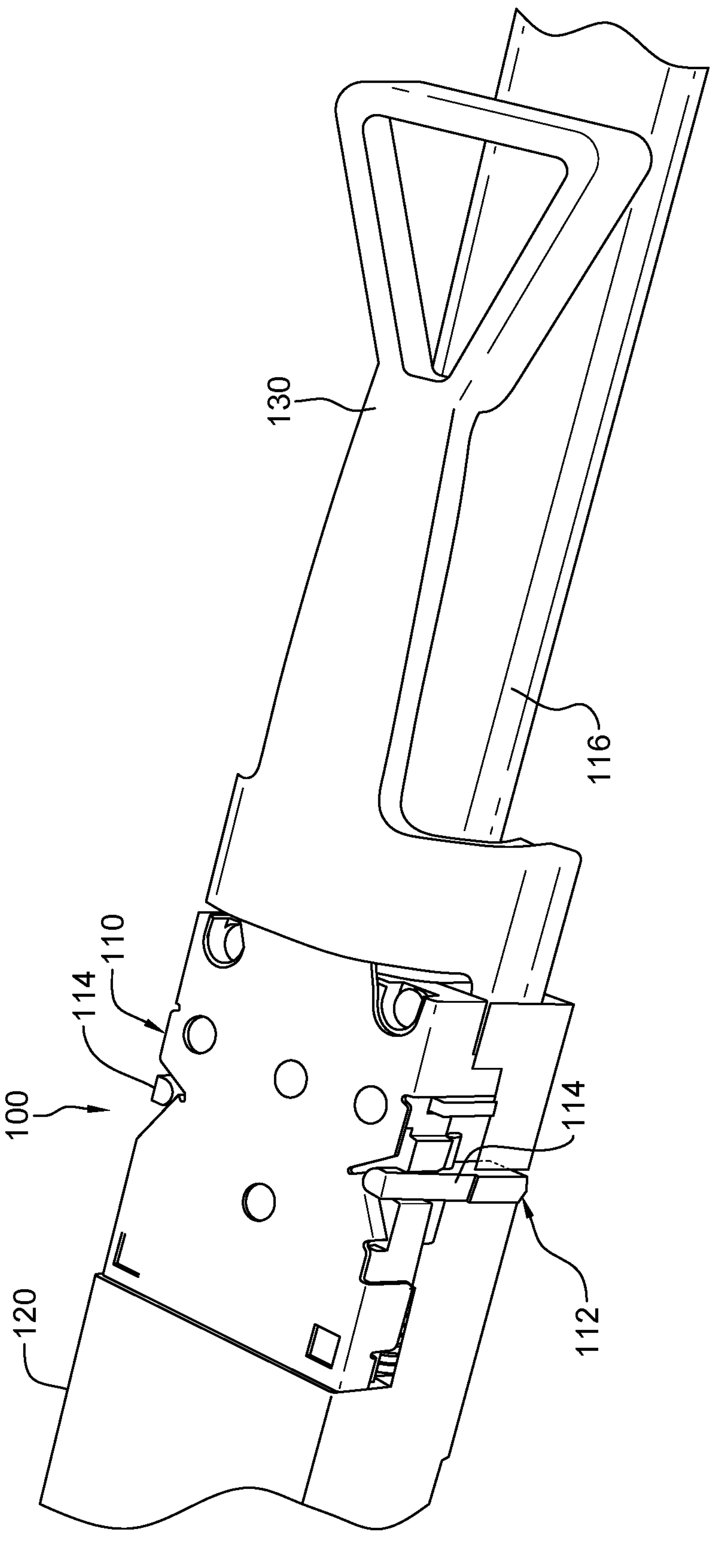
FIG. 1A is a partial cutaway depiction of one embodiment of a connector assembly with a release mechanism to be modified, in accordance with one or more aspects of present disclosure.

Aspects of the present disclosure and certain features, advantages, and details thereof, are explained more fully below with reference to the non-limiting example(s) illustrated in the accompanying drawings. Descriptions of well-known materials, systems, devices, cables, connectors, etc., are omitted so as not to unnecessarily obscure the disclosure in detail. It should be understood, however, that the detailed description and the specific example(s), while indicating aspects of the disclosure, are given by way of illustration only, and are not by way of limitation. Various substitutions, modifications, additions, and/or arrangements, within the spirit and/or scope of the underlying inventive concepts will be apparent to those skilled in the art from this disclosure. Note further that reference is made below to the drawings, where the same or similar reference numbers used throughout different figures designate the same or similar components. Also, note that numerous inventive aspects and features are disclosed herein, and unless inconsistent, each disclosed aspect or feature is combinable with any other disclosed aspect or feature as desired for a particular application of the concepts disclosed.

Networks, such as computer networks, communication networks, and other networks, often rely on cables to connect components of the network to one another. Within a computer network, a large number of cables can be used to interconnect network components, both within a housing, such as an electronics rack, and between racks. Note is this regard a rack of computing equipment, can represent a partial network, a single network, or multiple interconnected networks. Note also that the phrase "network" is used broadly herein to refer to any computer, communications, power, etc., system, with two or more components interconnected, such as by cables. The components can be any of a variety of components, with a rack, such as a server rack of a data center, being one example only of a network, or portion of a network, having cables plugged between components for a desired operational configuration. The cables can be, for instance, signal cables, data cables, power cables, input/output cables, or other communication or data cables, etc. Typically, a cable has a cable connector at a first end and another cable connector at a second end. Further, the components of the network can have connector receptacles configured for operatively plugging or docking the appropriate cable connectors into to interconnect components of the system in the desired network configuration. Note also that, although typically having a first end and a second end, a "cable" can include a configuration with multiple first ends and/or multiple second ends, each having associated therewith a cable connector to be plugged into to a respective connector receptacle of the system.

Note that "cable connector" and "connector receptacle" are broadly used herein to refer to any first connector and any second connector configuration to operatively plug or dock together so as to form an electrical or optical connection, such as to transfer signals, data, power, etc. The cable connector (or connector) can denote any type of connector that plugs or operatively docks to another connector, referred to herein as a connector receptacle (or receptacle). There are a variety of different types of cable connectors and connector receptacles available, including, for data or signal connector assemblies, power connector assemblies, etc.

Figure 1B:
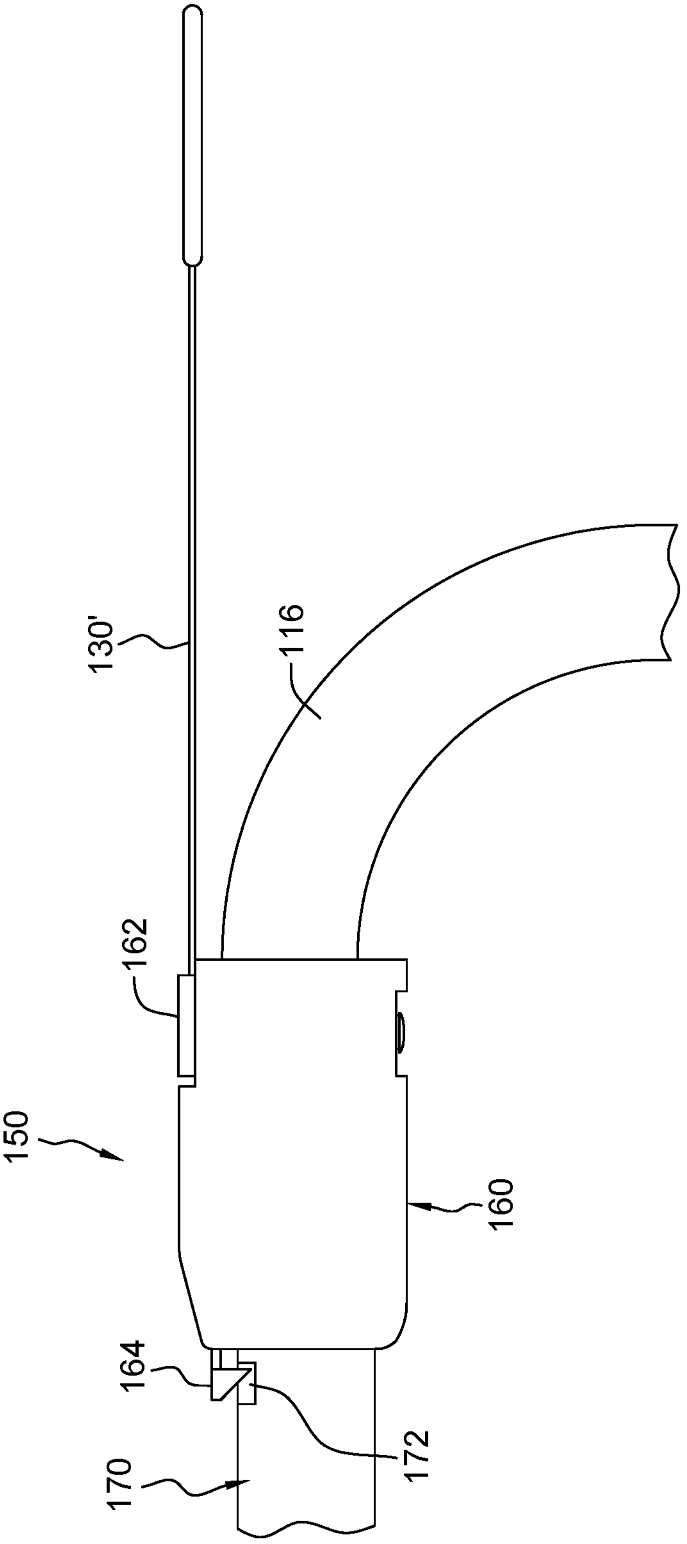
FIG. 1B depicts another embodiment of a connector assembly with a release mechanism to be modified, in accordance with one or more aspects of present disclosure.

By way of example, FIGS. 1A-1B depict two exemplary embodiments of signal connector assemblies, such as high fidelity signal interconnects, used in main frame computing networks. The depicted connector assemblies each include a release mechanism to facilitate unlatching the assembly. As explained herein, these release mechanisms are to be modified, in accordance with one or more aspects of the present disclosure.

In FIG. 1A, a connector assembly 100 is depicted which includes a cable connector 110 and a connector receptacle 120 operatively coupled and latched together. In one or more embodiments, connector receptacle 170 is associated with, or coupled to, an electronic component (not show). Connector assembly 100 further includes a latching mechanism 112 associated with cable connector 110. In embodiments, latching mechanism 112 includes one or more latches 114, which are shown engaging or extending into, for instance, appropriate cutouts or channels in connector receptacle 120 to latchably secure cable connector 110 to connector receptacle 120 when operatively coupled together. A release mechanism, such as a pull tab 130, is provided in association with latching mechanism 112 of cable connector 110 to allow user activation of the latching mechanism for unlatching and disconnecting cable connector 110 from connector receptacle 120 when desired. In one or more embodiments, pull tab 130 extends axially back over cable 116 from cable connector 110, and is a substantially rigid pull tab. In operation, an operator disengages latching mechanism 112 by applying a pull force to pull tab 130 to achieve unlatching of cable connector 110 from connector receptacle 120.

Figure 2A:
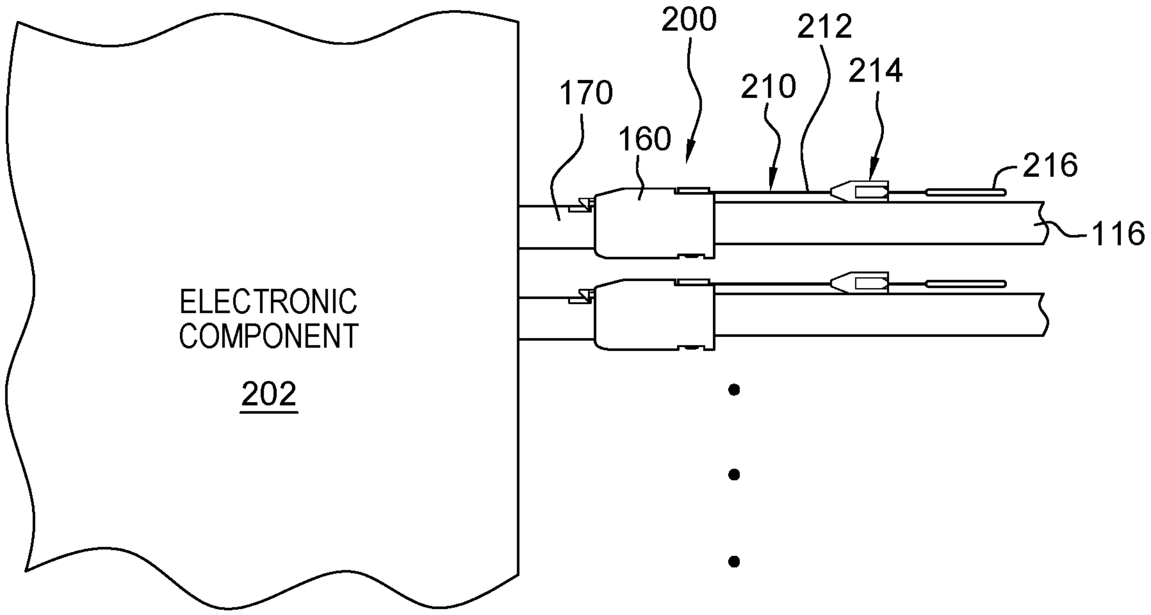
FIG. 2A depicts one embodiment of a connector assembly and release mechanism, in accordance with one or more aspects of present disclosure.

In FIG. 1B another connector assembly 150 is shown with a cable connector 160 operatively docked or plugged into a connector receptacle 170, which can be associated with, or coupled to, an electronic component (such as illustrated in FIG. 2A). In the FIG. 1B embodiment, cable connector 160 includes a latching mechanism 162 with one or more latches 164 engaging, or extending into, one or more grooves or channels 172, such one or more grooves or channels in an outer surface of connector receptacle 170 in one or more embodiments. In addition, cable connector 160 includes a release mechanism, such as a pull tab 130', which when actuated facilitates unlatching of cable connector 160 from connector receptacle 170 by, for instance, lifting and releasing latch(es) 164 from channel(s) 172, thereby facilitating disconnecting cable connector 160 from connector receptacle 170. In one or more embodiments, pull tab 130' is similar to pull tab 130 of FIG. 1A, and can be, for instance, a substantially rigid pull tab extending axially back from cable connector 160 so as to be accessible by a user, such as an operator of a data center, in one example.

Note that FIGS. 1A-1B are exemplary embodiments of two high fidelity signal interconnects for network systems with a "pull-to-actuate" mechanism (i.e., release mechanism) to unlatch the connector from the respective receptacle. These types of connectors can be complex, expensive and often hard to reach when operatively connected, such as in a recessed, plugged location of a system network component. When an operator pulls on the release (e.g., pull tab) the mechanism unlatches and the connector can be unplugged. Note that such complex signal interconnect cables and their associated connectors can be fragile, and subject to damage with excessive pulling, snagging, or other over forcing events. Sometimes a cable connector and/or connector receptacle can become wedged in place due to tolerance issues, or a pull force being applied that is off axis, or other type of binding case. This can result in high forces or stresses being applied to the cable connector, also possibly resulting in a broken release with no easy way to remove and/or replace the now damaged cable connector, cable and/or release.

Release elements, such as pull tabs or cable tabs, are touch-locations designed to apply force to unlatch and remove a cable connector from its operative connection to a connector receptacle. As described, these release elements, and the associated cable connectors can be damaged in a variety of modes. For instance, the release element (e.g., typically formed of a plastic) can break and/or cannot be removed, in which case the cable connector and cable would need to be manually unlatched and removed with tools, and likely discarded. In a situation where the release element does not break, excessive force and/or moment on the pull tab can be transmitted to the cable connector, which can result in damage to the latching mechanism and/or to one or more contacts of the cable connector, in which case the cable connector and cable would need to be removed, and likely discarded.

Addressing these issues, disclosed herein are apparatuses and methods of providing strain-limiting release mechanisms for cable connectors, and cable connections, such as described. By way of example, FIG. 2A depicts one embodiment of a connector assembly 200 with a release mechanism 210, in accordance with one or more aspects of present disclosure. Connector assembly 200 of FIG. 2A is similar to connector assembly 150 described above in connection with FIG. 1B, with an exception being that release mechanism 210 includes a strain-limiting pull release 212 operatively coupled to latching mechanism 162 of cable connector 160 to facilitate selective release of latch(es) 164 of the latching mechanism from latching cable connector 160 of cable 116 to connector receptacle 170. In embodiments, connector receptacle 170 is coupled to, or part of, an electronic component 202 of a system or system network.

In one or more embodiments, pull release 210 is adapted to, at least in part, break apart or uncouple in operation in response to a predetermined excess stress event on the pull release in order to protect cable connector 160 from excessive stress due to the stress event. Note that various embodiments of pull release 210 are described and depicted herein, by way of example only. In one or more embodiments, pull release 210 is adapted to break apart or uncouple by incorporating a releasable coupling 214 as part of pull release 210, with the releasable coupling being designed to break apart in operation in response to the predetermined excess stress event on pull release 210 in order to protect cable connect 160 from excessive stress due to the stress event.

Note that various releasable coupling 214 embodiments are disclosed herein, one or more of which accommodate axial forces on pull release 210 as well as moment or angular forces on pull release 210. In embodiments, one or more releasable coupling features are disclosed which allow tailoring (e.g., configuring, designing, etc.) of the releasable coupling to break apart in operation in response to one or more specific applied axial and/or moment (or angular force) on the release mechanism. In this manner, different sensitivity to applied axial forces versus applied moments can be achieved, which can be desirable for certain connectors, such as certain complex signal cable connectors used in today's mainframe systems. In the embodiment of FIG. 2A, releasable coupling 214 is disposed along pull release 210 between cable connector 160 and a distal end of pull release 210. In one or more embodiments, the distal end of pull release 210 includes a handle 216 or other element adapted to facilitate an operator manually engaging pull release 210 to apply a pull force to unlatch cable connector 160 from connector receptacle 170 when desired.

Figure 2B:
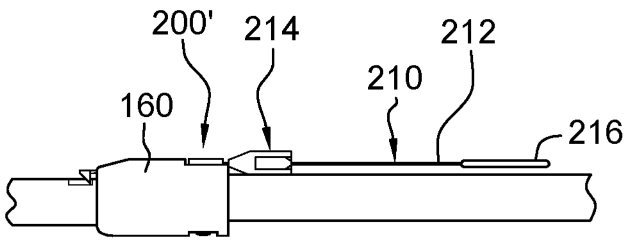
FIG. 2B depicts another embodiment of a connector assembly and release mechanism, in accordance with one or more aspects of present disclosure.

FIG. 2B depicts an alternate embodiment of release mechanism 210 where releasable coupling 214 of release mechanism 210 is located at cable connector 160. For instance, in one embodiment, at least part of releasable coupling 214 can be connected to, or integrated with, cable connector 160 such that pull release 212 extends axially back along cable 116 from releasable coupling 214. Connecting (e.g., using a structural adhesive) or integrating (e.g., molding, in part) releasable coupling 214 of release mechanism 210 to cable connector 160 can, in one or more embodiments, provide additional structural strength to the releasable coupling 214 and release mechanism 210.

Figure 2C:
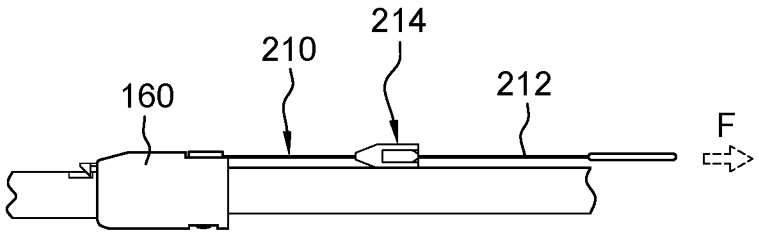
FIG. 2C illustrates the connector assembly and release mechanism of FIG. 2A with an axial force being applied to the release mechanism, in accordance with one or more aspects with present disclosure.
Figure 2D:
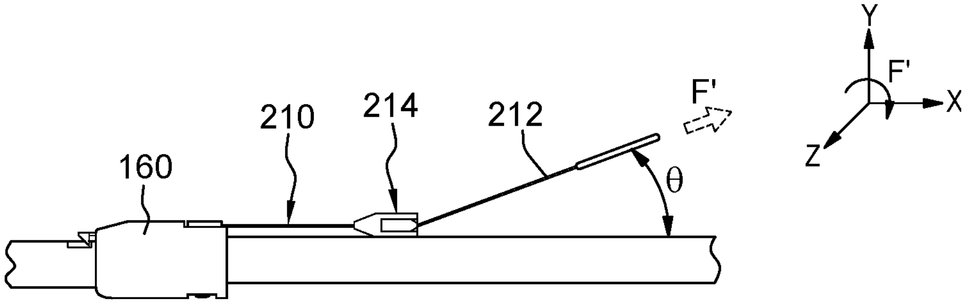
FIG. 2D illustrates the connector assembly and release mechanism of FIG. 2A with a moment force being applied to the release mechanism, in accordance with one or more aspects of present disclosure.

FIGS. 2C-2D depict connector assembly 200 of FIG. 2A with a force F being applied axially to pull release 212 of release mechanism 210 in FIG. 2C, and a 2D moment F' (or angular force) being applied to pull release 212 of release mechanism 210 in FIG. 2D, where the 2D moment F' (in X and Y direction) is at least partially absorbed by adjustments within releasable coupling 214, rather than being fully transmitted to cable connector 160, as described further herein.

As noted, the release mechanisms disclosed advantageously include a releasable coupling as part of the pull release, such as intermediate the ends of the pull release in one or more embodiments, or at the cable connector, in one or more other embodiments. The releasable coupling is designed with a point of weakness to, at least in part, break apart or uncouple in operation in response to a predetermined excess stress event on the pull release, to facilitate protecting the cable connector from excessive stress due to the stress event. For instance, the predetermined stress event can be a predetermined force and/or moment (angular force) applied to the handle of the release mechanism, and thus to the releasable coupling, to prevent permanent damage to the connected cable connector (and connector receptacle) and/or the release mechanism itself. Advantageously, the release mechanisms disclosed herein are sensitive to off-axis forces as well as axial forces, with features that can be sized and/or configured to increase or decrease sensitivity to each type of force, as desired for a particular application. This allows the release mechanisms, and in particular, the releasable coupling of the release mechanism, to break apart, separating part of the pull release from the cable connector when a threshold force or moment is reached. This advantageously prevents damage to the cable connector, as well as to the cable. Also, release couplings disclosed herein are reusable or re-attachable if separated by an excessive force, which allows the user to either reattach the pull release and more carefully actuate the mechanism, or further analyze the system for a reason for a binding of the cable connector in the plug housing preventing its unlatching and removal.

FIGS. 3A-3D depict further details of one embodiment of releasable coupling 214, which as shown includes one coupling element 300 and another coupling element 310 releasably coupled together to form releasable coupling 214. Referring collectively to FIGS. 3A-3D, the connector assembly described above with reference to FIG. 2A is shown with release mechanism 210 including the strain-liming pull release 212 operatively coupled to latching mechanism 162 of cable connector 160 to facilitate selective release of latch 164 of the latching mechanism from latching cable connector 160 to connector receptacle 170.

In one or more embodiments, coupling element 300 of releasable coupling 214 is configured with an opening 301, such as a slot, to operatively, releasably receive, at least in part, coupling element 310 within coupling element 300. In the embodiment of FIGS. 3A-3D, coupling element 310 resides principally within opening 301, by way of example only. In one or more embodiments, coupling element 300 includes at least one wedge feature 302 at in interface between coupling element 300 and coupling element 310, which is calibrated to facilitate releasing coupling element 310 from coupling element 300 with application of a predetermined excess stress event on pull release 212, such as an excessive applied force on handle 216 of pull release 212, to facilitate breaking apart the releasable coupling in response to the excess stress event on the pull release, and thereby protect the cable connector, the cable, and the pull release from damage due to excessive stress or strain.

Figure 3A:
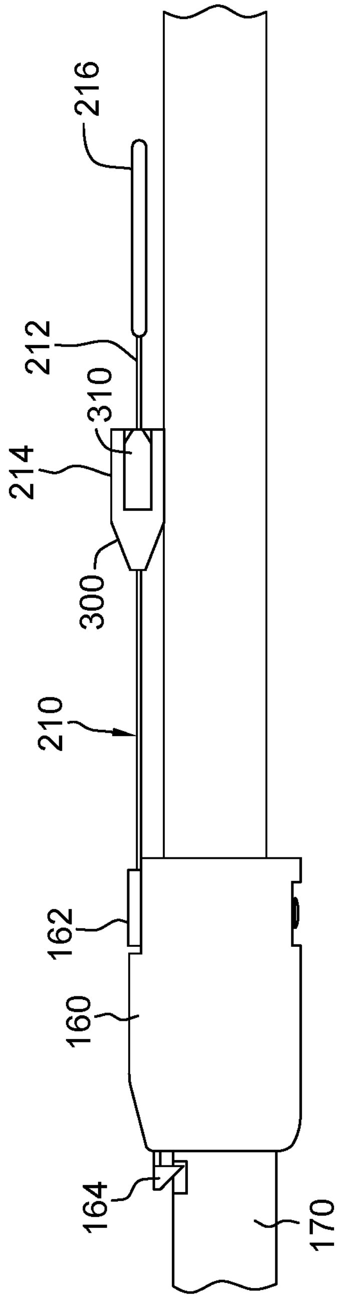
FIGS. 3A-3D depict in greater detail one embodiment of the connector assembly and release mechanism of FIG. 2A, in accordance with one or more aspects of present disclosure.
Figure 3B:
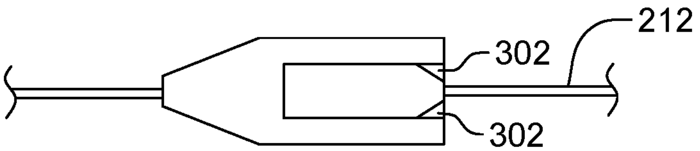
Figure 3C:
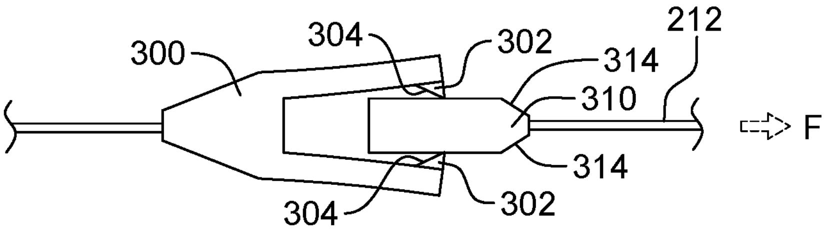
Figure 3D:
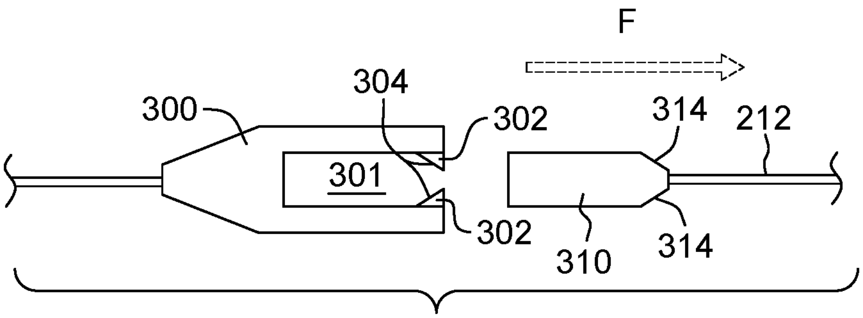

By way of example, in the embodiment of FIGS. 3A-3D, coupling elements 300, 310 of releasable coupling 214 include tapered contact surfaces 304, 314, respectively. In embodiments, the tapered contact surfaces 304, 314 and the flexibility of coupling element 300 and/or coupling element 310 can be calibrated (e.g., designed, chosen, tailored, etc.) to facilitate breaking apart of releasable coupling 214 in response to a specified or predetermined excess stress event on the pull release. For instance, in one or more embodiments, coupling element 300 and/or coupling element 310 can be fabricated of a molded plastic or elastic material which is sufficiently flexible or ductile to allow flexing of the coupling element with application of an excessive force on handle 216 of pull release 212. An example of this is depicted in FIG. 3C, which illustrates flexing of coupling element 300 with the application of an excessive axial force F. Advantageously, with the embodiment of FIGS. 3A-3D, tapered contact surfaces 304, 314 of coupling elements 300, 310 can be calibrated (e.g., tapered or angled) to facilitate releasable coupling 214 breaking apart in response to a specified axial stress event and/or one or more specified angular stress events on the pull release, to thereby protect the cable connector and cable from excessive stresses. In the embodiment depicted, release mechanism 214 is a two piece release mechanism with the pieces coupling, in part, via the tapered contact faces of the releasable couplings in both an axial and perpendicular direction. This geometry can be optimized for coupling element 300 and coupling element 310, which as noted couple together to form the releasable coupling. In one embodiment, excessive force causes coupling element 300 to flex outward as coupling element 310 is pulled away (either axial and/or angularly) and eventually allows for decoupling of the coupling elements, as illustrated in FIG. 3D, before the cable connector can be damaged.

Figure 4A:
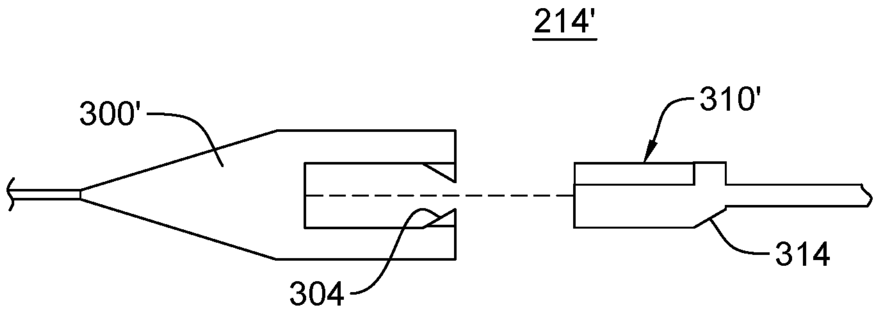
FIGS. 4A-4C depict another embodiment of a releasable coupling of a release mechanism for a connector assembly, such as illustrated in FIGS. 3A-3D, in accordance with one or more aspects of the present disclosure.
Figure 4B:
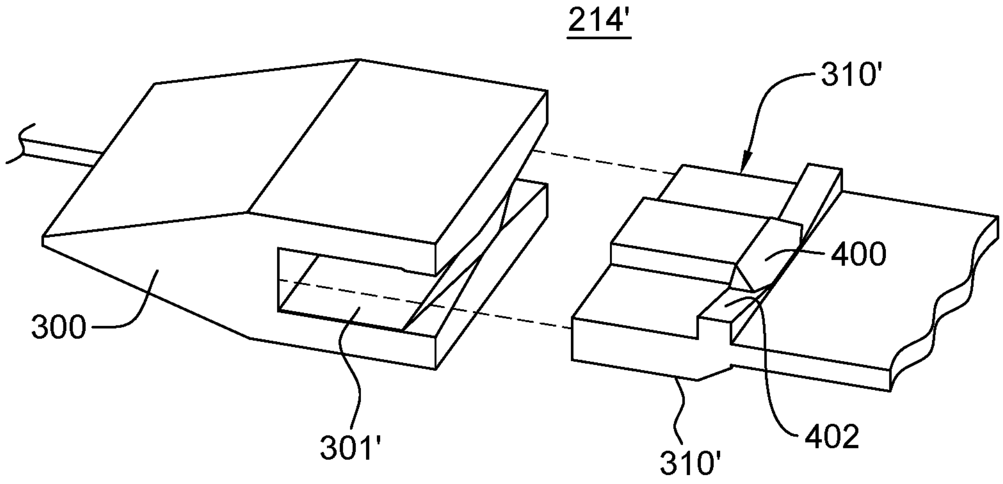
Figure 4C:
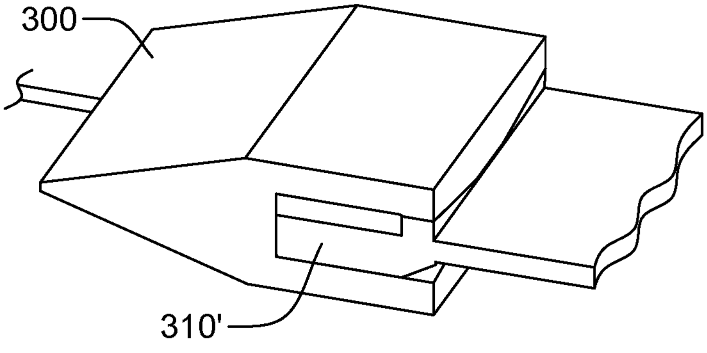

FIGS. 4A-4C illustrate a more detailed embodiment of a releasable coupling 214' similar to releasable coupling 214 of FIGS. 3A-3D. Referring collectively to FIGS. 4A-4C, releasable coupling 214' includes a coupling element 300' with a slot 301' configured to releasably receive, at least in part, coupling element 310' within the slot to form releasable coupling 214', as illustrated in FIG. 4C. Unless otherwise indicated, coupling element 300' and coupling element 310' are similar to coupling elements 300, 310 of FIGS. 3A-3D. For instance, in one or more embodiments, one or both of coupling elements 300', 310' can be fabricated of a molded plastic or elastic material which is sufficiently flexible or ductile to perform as described herein. In one embodiment, flexibility is provided in coupling element 300' for a specified force on coupling element 310' to result in disengaging of coupling element 310' from coupling element 300'. By way of example, in the embodiment of FIGS. 4A-4C, coupling element 310' includes multiple angled interface surfaces 400, 402 which are configured to interface with corresponding angled surfaces of coupling element 300', when coupling element 310' engageably resides within slot 301' of coupling element 300' to form releasable coupling 214'. In this manner, tapered contact surfaces are provided in both an axial direction to the pull release and a perpendicular direction to the pull release, and the size and configuration of the respective contact surfaces can be tailored (e.g., designed, constructed, etc.) to calibrate the breaking apart of the releasable coupling 214' to a particular predetermined excess axial stress event, and/or to one or more particular angular stress events on the pull release. By altering the angles of the angled interface surfaces, the releasable coupling can be calibrated to detach at specific force and moment thresholds, as desired for a particular application. Note that in the embodiment of FIGS. 4A-4C, the axially wedge-shaped fin 400 increases the outward flex caused by the linear component of force; that is, if moment is applied along with the axial force.

FIGS. 5A-5F depict another embodiment of a release mechanism 210', in accordance with one or more aspects disclosed herein. As illustrated in FIGS. 5A-5F, release mechanism 210' includes a pull release 212' and handle 216', similar to pull release 212 and handle 216, described above in connection with FIGS. 3A-3D. In addition, release mechanism 210' includes a releasable coupling 214" configured as a ball-joint-type coupling. In particular, releasable coupling 214" includes one coupling element 300" and another coupling element 310". In this example, coupling element 300" includes multiple arms 500, and receives coupling element 310" within a space 501 defined by the multiple arms 500. In one or more embodiments, coupling element 310" is, or includes, an at least partially rounded feature, such as a semi-sphere, hemisphere, or sphere, which facilitates defining the ball-joint-type releasable coupling. As one example, in FIGS. 5A-5F releasable coupling 214" is located at, or adjacent to, cable connector 160 of connector assembly 150, with the cable connector shown operatively coupled to connector receptacle 170 and latched thereto by latching mechanism 162, which as shown, includes one or more latches 164 engaging respective grooves or channels in connector receptacle 170.

Figure 5A:
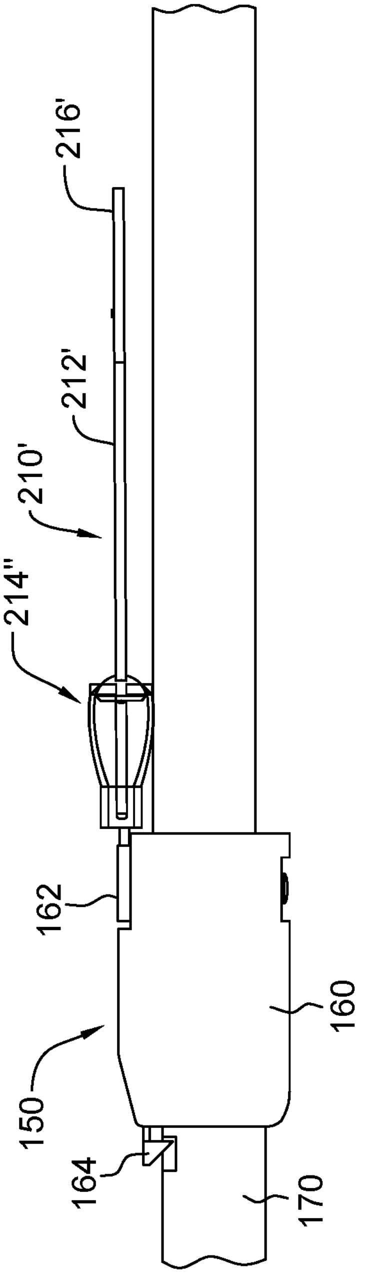
FIGS. 5A-5F illustrate another embodiment of a connector assembly and release mechanism, in accordance with one or more aspects of the present disclosure.
Figure 5B:
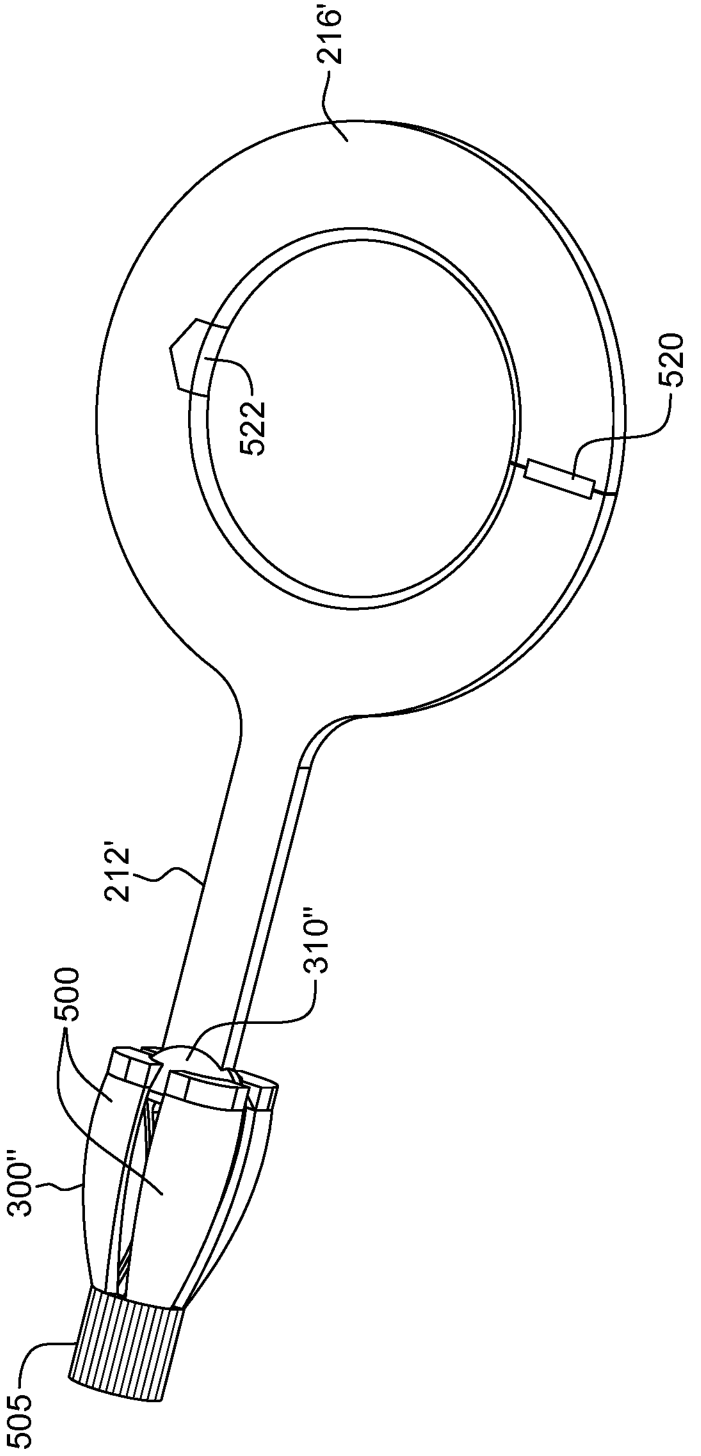
Figure 5C:
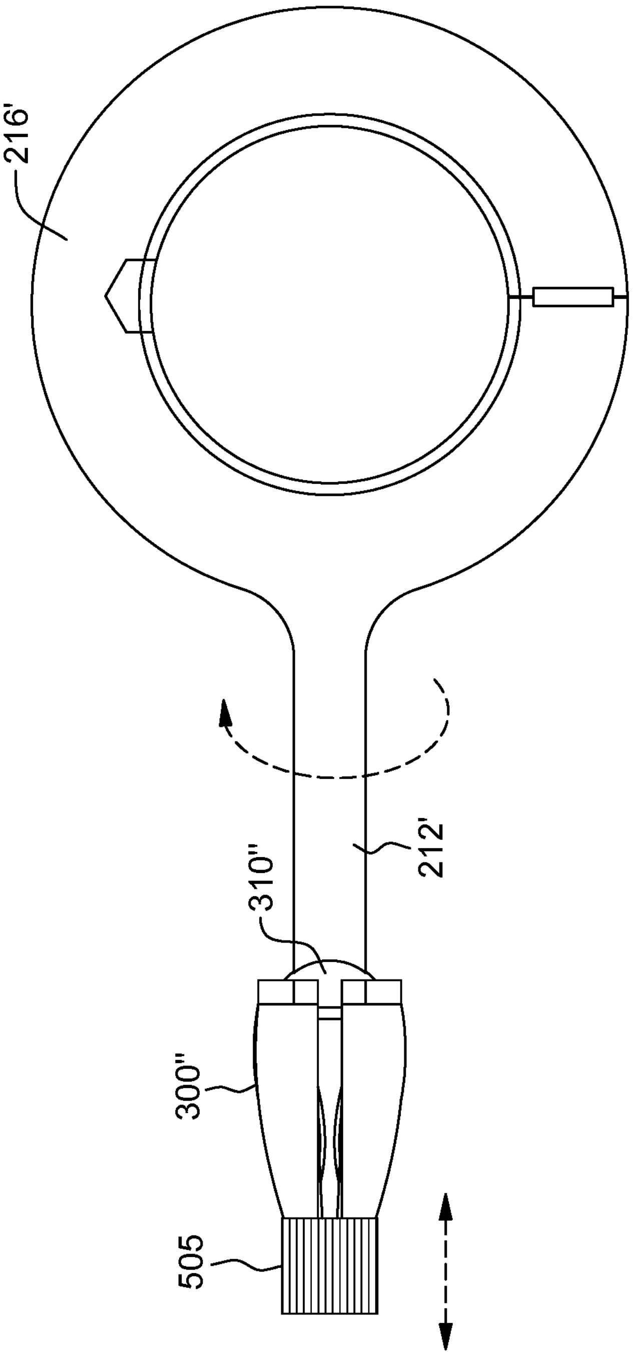
Figure 5D:
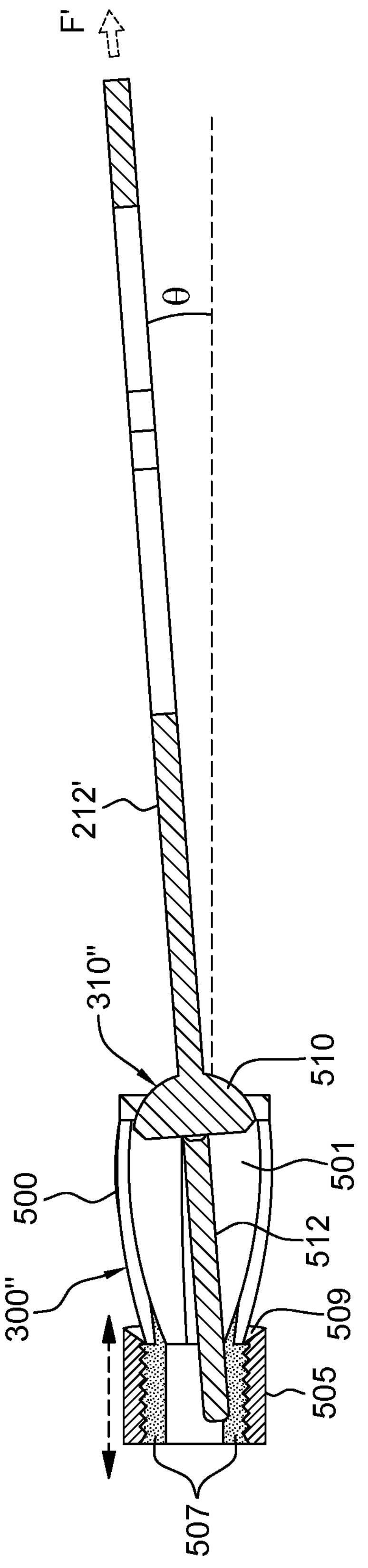
Figure 5E:
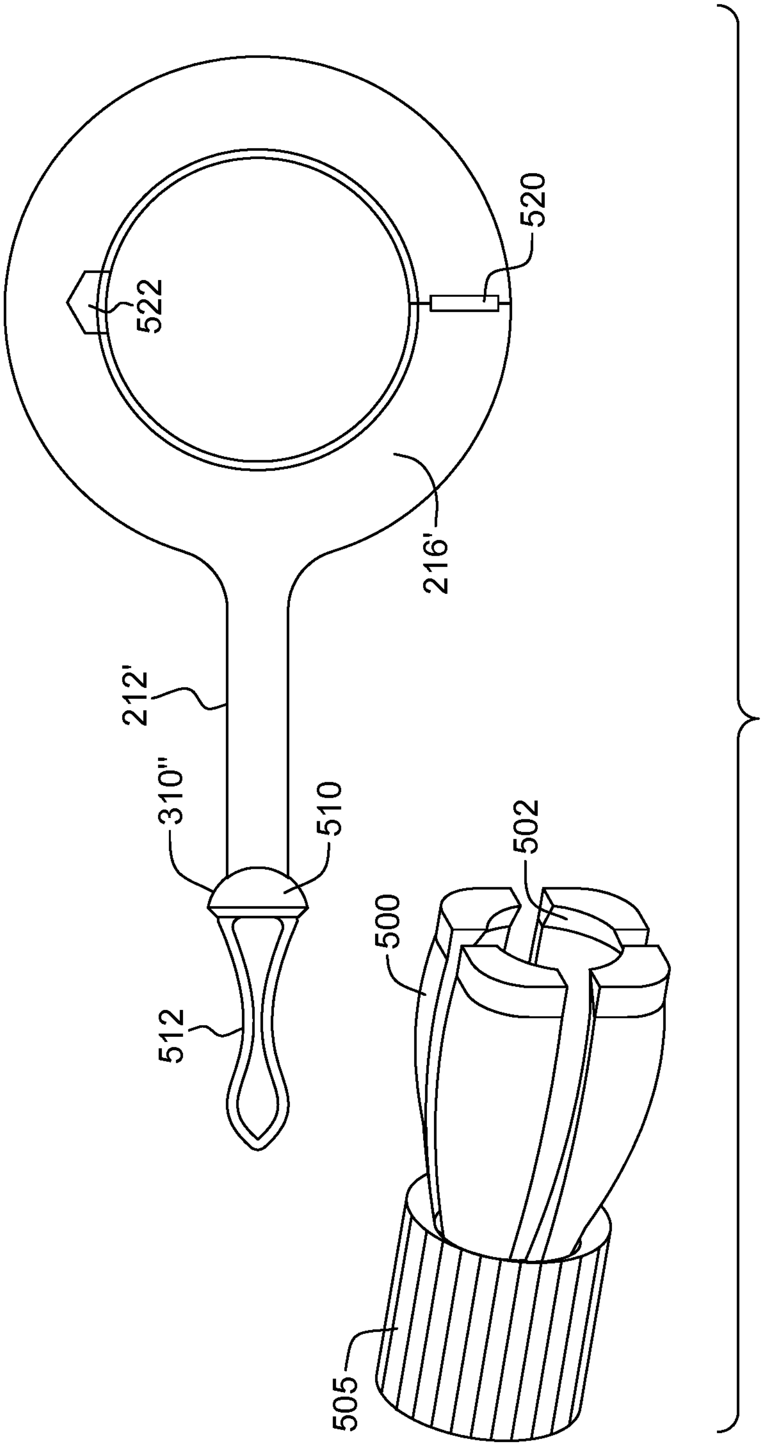
Figure 5F:
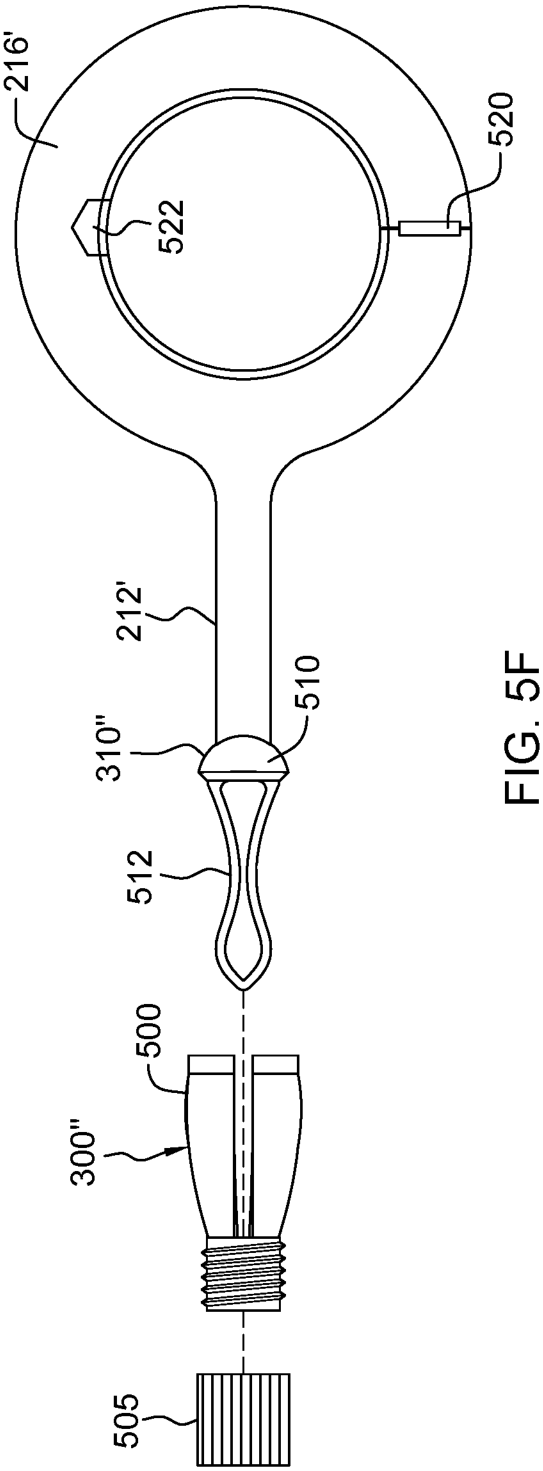

In the embodiment of FIGS. 5A-5F, coupling element 310" includes (in addition to at least partially rounded feature 510) a biasing spring 512, with the at least partially rounded feature 510 and biasing spring 512 residing, at least in part, within opening 501 defined by arms 500 of coupling element 300". In one or more embodiments, biasing spring 512 is a moment-resisting, right-biasing spring, such as illustrated in FIG. 5D. In FIG. 5D, an angular force F' is being applied to pull release 212' at an angle θ from horizontal, and the moment resisting, right-biasing spring 512 is resisting the moment force.

In one or more embodiments, an adjustable release control 505 is associated with coupling element 300" to adjustably interface with multiple arms 500 to control a release force required to release the at least partially rounded feature 510 of coupling 310" from space 501 of coupling element 300". In one or more embodiments, adjustable release control 505 threadably engages a base 507 such that the amount which a tapered end 509 of control 505 overlays and constrains arms 500 can be varied to adjust, for instance, the axial and/or angular force (e.g., the predetermined excess stress event) required to break apart releasable coupling 214".

Advantageously, the ball-joint-type releasable coupling, such as releasable coupling 214" illustrated by way of example in FIGS. 5A-5F, can provide multiple non-obstructed pull orientations on coupling element 310" using, for instance, handle 216'. In this embodiment, pull release handle 216' can rotate about all axes, providing three degrees of freedom in applying a pull force to the release mechanism 210', and thus to latching mechanism 162 of cable connector 160.

As a further enhancement, the release mechanism of FIGS. 5A-5F can also include a force warning indicator 520 integrated with pull release 212', and in particular, within handle 216', by way of example only. In one or more embodiments, force warning indicator 520 is disposed opposite a notch 522 in handle 216', to allow the handle to move (or pivot) with an applied force at the end of the handle, and to expose an applicable portion of the visual force warning indicator representative of the level of applied force to pull release 212', as illustrated in FIGS. 6A-6C.

Figure 6A:
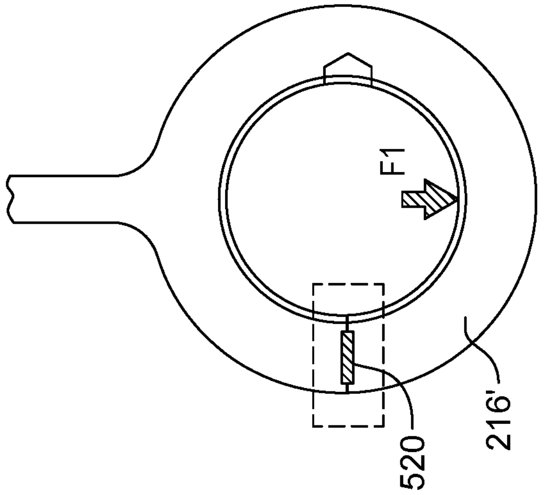
FIGS. 6A-6C depicts further details of one embodiment of the release mechanism of FIGS. 5A-5F, and in particular, of a force warning indicator which progressively changes with different amounts of force being applied to the pull release, in accordance with one or more aspects of present disclosure.
Figure 6B:
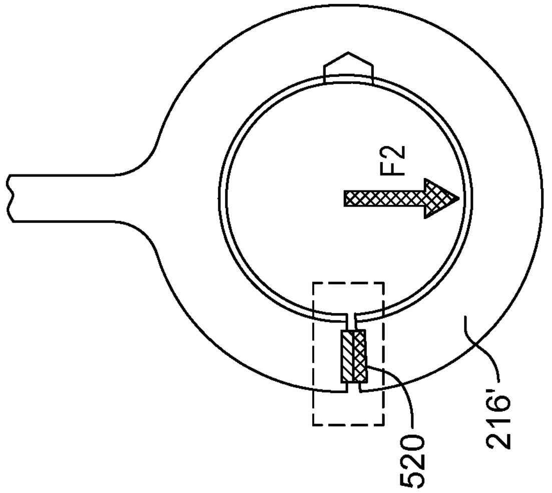
Figure 6C:
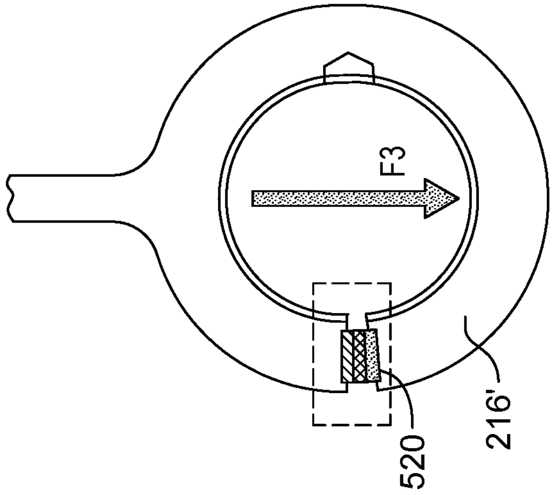

In FIG. 6A, force warning indicator 520 illustrates application of an acceptable applied force level F1, in FIG. 6B force warning indicator 520 indicates a higher applied force level F2, and in FIG. 6C force warning indicator 520 indicates application of an excessive force level F3 to handle 216' of the release mechanism, which is indicative of a force sufficient to begin uncoupling of the releasable coupling. In one or more embodiments, the different force warning levels of the indicator can be different colors, such as green, yellow, and red. Note also that the force warning indicator can be integrated within the release mechanism in any desired location to provide an operator with a visual indication of a potential over force, and/or a progressive indication of the different amounts of force applied to the pull release. In embodiments, the force warning indicator is a progressive, visual indicator which indicates, for instance, when the applied force is approaching a limit of the releasable coupling break away, allowing the user to adjust the force being applied to prevent break away of the releasable coupling.

Those skilled in the art will note from the above description that provided herein are apparatuses and methods which include a release mechanism to connect to a cable connector. The cable connector is latchable to a connector receptacle coupled to an electronic component. The release mechanism includes a pull release to operatively couple to a latching mechanism of the cable connector to selectively release a latch of the latching mechanism from latching the cable connector to the connector receptacle when operatively coupled to the connector receptacle. The pull release is adapted to, at least in part, break apart or decouple in operation in response to a predetermined excess stress event on the pull release to facilitate protecting the cable connector from excessive stress due to the stress event.

In one or more embodiments, the release mechanism includes a releasable coupling integrated with the pull release. The releasable coupling is designed to, at least in part, break apart or decouple in operation in response to the predetermined excess stress event on the pull release to facilitate protecting the cable connector from the excessive stress due to the stress event. In one or more embodiments, the releasable coupling includes one coupling element and another coupling element releasably coupled together to form the releasable coupling. The one coupling element is configured to releasably receive, at least in part, the other coupling element.

In embodiments, the one coupling element includes at least one wedge feature at an interface between the one coupling element and the other coupling element. The at least one wedge feature can be calibrated to facilitate releasing the other coupling element in response to the predetermined excess stress event on the pull release to facilitate protecting the cable connector from the excessive stress due to the stress event.

In embodiments, the one coupling element and the other coupling element include tapered contact surfaces in both an axial direction to the pull release and a perpendicular direction to the pull release, where one or more of the tapered contact surfaces are calibrated to facilitate the releasable coupling breaking apart in response to the predetermined stress event on the pull release to protect the cable connector from the excessive stress due to the stress event. In one or more embodiments, the one coupling element has a slot, and the other coupling element releasable resides, at least in part, within the slot in the one coupling element, with the one coupling element and the other coupling element being releasably coupled together as the releasable coupling.

In one or more embodiments, the one coupling element and the other coupling element form a ball-joint-type releasable coupling. In embodiments, the one coupling element includes multiple arms, and the one coupling element releasably receives the other coupling element in a space defined by the multiple arms, where the other coupling element includes an at least one partially rounded feature received within the space defined by the multiple arms of the one coupling element. In one or more embodiments, an adjustable release control is associated with the one coupling element to adjustably interface with the multiple arms to control a release force required to release the at least partially rounded feature of the other coupling element from the space defined by the multiple arms of the one coupling element.

In embodiments, the releasable coupling includes a moment-sensitive structure calibrated to facilitate the breaking apart of the releasable coupling in operation in response to a predetermined moment stress on the pull release, where the predetermined stress event includes the predetermined moment stress.

In one or more embodiments, a progressive force warning indicator is integrated into the pull release to visually indicate an over force warning with application of a predefined excess force on the pull release.

In one or more embodiments, an apparatus and method are provided for cable connector strain reduction. The device includes a pull release, or pull tab, connected to a cable connector connectable to an electronic device, and in particular, to a connector receptacle of an electronic device. The pull tab, or release element, is adapted to break away in response to a predetermined stress event on the pull tab to protect the cable connector from excessive stress from the stress event. The stress event can include a force, or a moment or angular force, subjected to the pull tab, and thereby the cable connector, when removing the cable connector from the electronic device.

The terminology used herein is for the purpose of describing particular embodiments only and is not intended to be limiting of the disclosure. As used herein, the singular forms "a", "and" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. An apparatus comprising:

a release mechanism to connect to a cable connector, the cable connector being latchable to a connector receptacle, the release mechanism comprising:

a pull release to operatively couple to a latching mechanism of the cable connector to selectively release a latch of the latching mechanism from latching the cable connector to the connector receptacle when operatively coupled thereto; and wherein the pull release is adapted to, at least in part, break apart in operation in response to a predetermined excess stress event on the pull release to facilitate protecting the cable connector from excessive stress due to the stress event.

2. The apparatus of claim 1, wherein the release mechanism further comprises a releasable coupling included as part of the pull release, the releasable coupling being design to, at least in part, break apart in operation in response to the predetermined excess stress event on the pull release to facilitate protecting the cable connector from the excessive stress due to the stress event.

3. The apparatus of claim 2, wherein the releasable coupling comprises one coupling element and another coupling element releasably coupled together to form the releasable coupling, the one coupling element being configured to releasably receive, at least in part, the other coupling element.

4. The apparatus of claim 3, wherein the one coupling element includes at least one wedge feature at an interface between the one coupling element and the other coupling element, the at least one wedge feature being calibrated to facilitate releasing the other coupling element in response to the predetermined excess stress event on the pull release to facilitate protecting the cable connector from the excessive stress due to the stress event.

5. The apparatus of claim 3, wherein the one coupling element and the other coupling element include tapered contact surfaces in both an axial direction to the pull release and a perpendicular direction to the pull release, where one or more of the tapered contact surfaces are calibrated to facilitate the releasable coupling breaking apart in response to the predetermined stress event on the pull release to facilitate protecting the cable connector from the excessive stress due to the stress event.

6. The apparatus of claim 5, wherein the one coupling element has a slot, and the other coupling element releasably resides, at least in part, within the slot of the one coupling element, with the one coupling element and the other coupling element releasably coupled together as the releasable coupling.

7. The apparatus of claim 3, wherein the one coupling element and the other coupling element form a ball-joint-type releasable coupling.

8. The apparatus of claim 7, wherein the one coupling element includes multiple arms, and the one coupling element releasably receives the other coupling element in a space defined by the multiple arms, and wherein the other coupling element includes at least one partially rounded feature received within the space defined by the multiple arms of the one coupling element.

9. The apparatus of claim 8, further comprising an adjustable release control associated with the one coupling element to adjustably interface with the multiple arms to control a release force required to release the at least partially rounded feature of the other coupling element from the space defined by the multiple arms of the one coupling element.

10. The apparatus of claim 2, wherein the releasable coupling includes a moment-sensitive structure calibrated to facilitate the breaking apart of the releasable coupling in operation in response to a predetermined moment stress on the pull release, the predetermined stress event including the predetermined moment stress.

11. The apparatus of claim 1, further comprising a force warning indicator integrated into the pull release to visually indicate an over-force warning with application of a predefined excess force on the pull release.

12. An apparatus comprising:

a cable connector to operatively latch to a connector receptacle coupled to an electronic component; and a release mechanism connected to the cable connector, the release mechanism comprising;

a pull release operatively coupled to a latching mechanism of the cable connector to selectively release a latch of the latching mechanism from latching the cable connector to the connector receptacle when operatively coupled thereto; and wherein the pull release is adapted to, at least in part, break apart in operation in response to a predetermined excess stress event on the pull release to facilitate protecting the cable connector from excessive stress due to the stress event.

13. The apparatus of claim 12, wherein the pull release mechanism comprises a releasable coupling included as part of the pull release, the releasable coupling being design to, at least in part, break apart in operation in response to the predetermined excess stress event on the pull release to facilitate protecting the cable connector from the excessive stress due to the stress event, and wherein the releasable coupling comprises one coupling element and another coupling element releasably coupled together to form the releasable coupling, the one coupling element being configured to releasably receive, at least in part, the other coupling element.

14. The apparatus of claim 13, wherein the one coupling element includes at least one wedge feature at an interface between the one coupling element and the other coupling element, the at least one wedge feature being calibrated to facilitate releasing the other coupling element in response to the predetermined excess stress event on the pull release to facilitate protecting the cable connector from the excessive stress due to the stress event.

15. The apparatus of claim 13, wherein the one coupling element and the other coupling element form a ball-joint-type releasable coupling.

16. The apparatus of claim 15, wherein the one coupling element includes multiple arms, and the one coupling element releasably receives the other coupling element in a space defined by the multiple arms, and wherein the other coupling element includes at least one partially rounded feature received within the space defined by the multiple arms of the one coupling element, and the apparatus further comprises an adjustable release control associated with the one coupling element to adjustably interface with the multiple arms to control a release force required to release the at least partially rounded feature of the other coupling element from the space defined by the multiple arms of the one coupling element.

17. The apparatus of claim 12, further comprising a force warning indicator integrated into the pull release to visually indicate an over-force warning with application of a predefined excess force on the pull release.

18. A method comprising:

providing a release mechanism for a cable connector, the cable connector being latchable to a connector receptacle, and the providing of the release mechanism for the cable connector comprising:

operatively coupling a pull release to a latching mechanism of the cable connector to selectively release a latch of the latching mechanism from latching the cable connector to the connector receptacle when operatively coupled thereto; and integrating a releasable coupling as part of the pull release, the releasable coupling being adapted to, at least in part, break apart in operation in response to a predetermined excess stress event on the pull release to facilitate protecting the cable connector from excessive stress due to the stress event.

19. The method of claim 18, wherein integrating the releasable coupling as part of the pull release comprises providing one coupling element and another coupling element releasably coupled together to form the releasable coupling, the one coupling element being configured to releasably receive, at least in part, the other coupling element.

20. The method of claim 19, further comprising integrating a force warning indication into the pull release to visually indicate an over-force warning with an application of a predefined excess force on the pull release.

* * * * *